US012596194B2

(12) United States Patent
Gogolla et al.

(10) Patent No.: US 12,596,194 B2
(45) Date of Patent: Apr. 7, 2026

(54) APPARATUS FOR OPTICALLY MEASURING THE DISTANCE TO A SCATTERING TARGET OBJECT OR A REFLECTING TARGET OBJECT

(71) Applicant: Hilti Aktiengesellschaft, Schaan (LI)

(72) Inventors: Torsten Gogolla, Schaan (LI); Andreas Winter, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 990 days.

(21) Appl. No.: 17/767,676

(22) PCT Filed: Oct. 1, 2020

(86) PCT No.: PCT/EP2020/077492
§ 371 (c)(1),
(2) Date: Apr. 8, 2022

(87) PCT Pub. No.: WO2021/069293
PCT Pub. Date: Apr. 15, 2021

(65) Prior Publication Data
US 2024/0118417 A1      Apr. 11, 2024

(30) Foreign Application Priority Data

Oct. 11, 2019    (EP) ..................................... 19202701

(51) Int. Cl.
*G01S 17/08*          (2006.01)
*G01S 7/481*          (2006.01)

(52) U.S. Cl.
CPC ............ *G01S 17/08* (2013.01); *G01S 7/4812* (2013.01); *G01S 7/4813* (2013.01)

(58) Field of Classification Search
CPC ...... G01S 17/08; G01S 7/4811; G01S 7/4814; G01S 7/4812; G02B 27/0087;
(Continued)

(56) References Cited

U.S. PATENT DOCUMENTS 9,927,524 B2    3/2018  Kaiser
2016/0054446 A1*  2/2016  Winter ..................... G01C 3/08
                                                    356/4.01
(Continued)

FOREIGN PATENT DOCUMENTS

CN        107683424  A  *  2/2018  ............. G01S 17/08
CN        110336183  B  *  8/2020  ........... G01S 7/4811
(Continued)

OTHER PUBLICATIONS

CN-107683424-A (Year: 2018).*
CN-110336183-B (Year: 2019).*

*Primary Examiner* — Sanjiv D. Patel
(74) *Attorney, Agent, or Firm* — Crowell & Moring LLP

(57)          ABSTRACT

An apparatus for optically measuring a distance to a scattering target object or a reflecting target object includes a laser beam source which is embodied as a first electro-optical component, a detector which is embodied as a second electro-optical component and which receives a reception beam that has been scattered at the scattering target object or a reception beam that has been reflected at the reflecting target object, and a laser beam shaping device with a first laser beam shaping optical unit and a second laser beam shaping optical unit where the second laser beam shaping optical unit is disposed downstream of the first laser beam shaping optical unit in a beam path of a laser beam. The second laser beam shaping optical unit is embodied as a first array of reflecting transmission elements where an orientation of the reflecting transmission elements is adjustable by a first control unit.

13 Claims, 5 Drawing Sheets

(58) Field of Classification Search
CPC ...... G02F 1/292; G02F 1/2955; H01S 5/0071;
H01S 3/10053; H01S 5/4056; G03F
7/70291; B81B 7/02
See application file for complete search history.

(56) References Cited

U.S. PATENT DOCUMENTS

| | | | |
|---|---|---|---|
| 2021/0080550 A1* | 3/2021 | Gassend | ................. G01S 17/89 |
| 2021/0293931 A1* | 9/2021 | Nemet | ................. G01S 7/4813 |

FOREIGN PATENT DOCUMENTS

| | | |
|---|---|---|
| DE | 103 23 317 A1 | 12/2004 |
| DE | 10 2005 049 471 A1 | 5/2007 |
| DE | 10 2013 205 589 A1 | 10/2014 |
| EP | 2 527 867 B1 | 11/2012 |
| WO | WO 2012/034881 A1 | 3/2012 |
| WO | WO 2016/184735 A1 | 11/2016 |

* cited by examiner

APPARATUS FOR OPTICALLY MEASURING THE DISTANCE TO A SCATTERING TARGET OBJECT OR A REFLECTING TARGET OBJECT

BACKGROUND AND SUMMARY OF THE INVENTION

The present invention relates to an apparatus for optically measuring the distance to a scattering target object or a reflecting target object.

EP 2 527 867 B1 has disclosed a distance measuring device with a coaxial arrangement, which generates a collimated laser beam. The distance measuring device comprises a laser beam source, a detector, a beam shaping optical unit with a laser beam shaping optical unit and a reception beam shaping optical unit, and a beam splitting optical unit, which separates the laser beam and reception beam from one another. The beam shaping optical unit is embodied as a collimation optical unit, which reshapes the laser beam into a collimated laser beam. The collimated laser beam which leaves the distance measuring device is designed for optically measuring the distance to scattering target objects. The radiant flux of the laser beam source is too high for the optical distance measurement to reflecting target objects, possibly leading to an overload of the detector. The use of collimated laser beams is disadvantageous in the case of reflecting target objects embodied as individual retroreflectors. A collimated laser beam must be aligned very accurately on the center of the individual retroreflector in order to prevent the case where the reception beam does not impinge upon the detector. If the laser beam does not impinge upon the center of the individual retroreflector, a parallel offset of the reception beam arises in relation to the optical axis of the laser beam.

The prior art has disclosed various suggestions for adapting a collimated laser beam designed for optically measuring the distance to scattering target objects to reflecting target objects with the aid of an adjustment device.

DE 10 2013 205 589 A1 has disclosed an apparatus for optically measuring the distance to scattering target objects and reflecting target objects. The apparatus comprises a laser beam source, a detector, and a laser beam shaping device with a first laser beam shaping optical unit and a second laser beam shaping optical unit, which differs from the first laser beam shaping optical unit and which is disposed in the beam path of the laser beam downstream of the first laser beam shaping optical unit. The first laser beam shaping optical unit is embodied as a collimation optical unit and designed for measuring the distance to scattering target objects. The laser beam source and the first laser beam shaping optical unit are fastened to a common optical unit support and form a distance measuring device. The second laser beam shaping optical unit is designed for measuring the distance to reflecting target objects and embodied as a diverging optical unit. To adapt the laser beam to different ranges of reflecting target objects, provision can be made of a plurality of second laser beam shaping optical units, embodied as diverging optical units, which differ from one another in terms of the diverging properties. The diverging optical units are integrated in an adjustment device, embodied as an optical unit wheel, for example, which is arranged outside of the distance measuring device.

In a development, the apparatus comprises a reception beam shaping device with a first reception beam shaping optical unit and a second reception beam shaping optical unit, which is arranged upstream of the first reception beam shaping optical unit in the beam path of the scattered or reflected reception beam. The first reception beam shaping optical unit is designed for measuring the distance to scattering target objects. The second reception beam shaping optical unit is designed for measuring the distance to reflecting target objects and embodied as a diffusion panel. The reflected reception beam can be attenuated with the aid of the diffusion panels in order to prevent an overload of the detector. To adapt the reception beam to different ranges of reflecting target objects, provision is made of a plurality of second reception beam shaping optical units, embodied as diffusion panels, which differ from one another in terms of the light-scattering properties.

The apparatus for optically measuring distances known from DE 10 2013 205 589 A1 has a plurality of disadvantages: Extraneous light in the form of directly or indirectly incident sunlight, is not sufficiently attenuated and increases the measurement error or the required measurement time. In contrast to the laser beam, extraneous light is not directed but may be incident from different directions. The second reception beam shaping optical units embodied as diffusion panels attenuate extraneous light to a much lesser extent than the directed reception beam. The adjustment device only serves to adjust the laser beam and, where applicable, the reception beam to reflecting target objects; it is not possible to adjust the laser beam and, where applicable, the reception beam to scattering target objects arranged at different ranges.

WO 2016/184735 A1 has disclosed a further apparatus for optically measuring the distance to scattering target objects and reflecting target objects. The apparatus comprises a laser beam source, a detector, and a laser beam shaping device with a first laser beam shaping optical unit and a second laser beam shaping optical unit, which differs from the first laser beam shaping optical unit and which is disposed in the beam path of the laser beam downstream of the first laser beam shaping optical unit. The first laser beam shaping optical unit is embodied as a collimation optical unit and designed for measuring the distance to scattering target objects. The second laser beam shaping optical unit is embodied as a first array of a plurality of transmission pixels and designed for measuring the distance to reflecting target objects, which may be embodied as individual retroreflectors or surface retroreflectors. By means of a first control unit, the transmittance of the transmission pixels is switchable between three states, non-transmissive with a transmittance of less than 10%, partly transmissive with a transmittance of between 10% and 90%, and fully transmissive with a transmittance of greater than 90%.

The laser beam can be adapted to the type of target object by way of the transmittance of the individual transmission pixels of the first array. To prevent an overload of the detector when measuring the distance to reflecting target objects, the radiant flux of the incident reception beam must be significantly lower than the radiant flux of the emitted laser beam. In the case of an individual retroreflector, at least 50% of the transmission pixels of the first array, which are disposed in the beam path of the laser beam, are switched into the non-transmissive transmission state. The transmission pixels which are disposed in the beam path of the laser beam and have a partly transmissive or fully transmissive embodiment form a transmission aperture for the laser beam, which facilitates a significant expansion of the laser beam. The expansion allows a reduction in the accuracy required in respect of the alignment of the laser beam on the individual retroreflector. In the case of partly transmissive transmission pixels, it is possible to change the proportion of transmitted radiant flux by way of the transmittance of the transmission pixels; the smaller the transmittance, the more pronounced the attenuation of the laser beam becomes.

In a development, the apparatus additionally comprises a reception beam shaping device with a first reception beam shaping optical unit and a second reception beam shaping optical unit, which is arranged upstream of the first reception beam shaping optical unit in the beam path of the scattered or reflected reception beam. The first reception beam shaping optical unit is embodied as a collimation optical unit and designed for measuring the distance to scattering target objects. The second reception beam shaping optical unit is embodied as a second array of a plurality of reception pixels and designed for measuring the distance to reflecting target objects. By means of a second control unit, the transmittance of the reception pixels is switchable between three states, non-transmissive with a transmittance of less than 10%, partly transmissive with a transmittance of between 10% and 90%, and fully transmissive with a transmittance of greater than 90%.

The apparatus for optically measuring distances known from WO 2016/184735 A1 does not allow an adjustment of the laser beam to different types of scattering target objects and to the distance from the scattering target object. The second laser beam shaping optical unit only serves to adapt the laser beam to different types of reflecting target objects, to the distance to the reflecting target object, and to the size of the reflecting target object. It is moreover disadvantageous that a large portion of the laser beam is masked as a result of the aperture, which may lead to a significantly structured and inhomogeneous laser beam and to a significant signal variation on account of diffraction effects.

The object of the present invention consists in the development of an apparatus for optically measuring distances, in which the laser beam can be adapted to the scattering target objects and to reflecting target objects. Moreover, extraneous light in the apparatus should be attenuated with little structural outlay.

According to the invention, the apparatus for optically measuring distances is characterized in that the second laser beam shaping optical unit is embodied as a first array of reflecting transmission elements, wherein the orientation of the reflecting transmission elements is adjustable by means of a first control unit. A second laser beam shaping optical unit embodied as a first array of a plurality of reflecting transmission elements is suitable for optically measuring the distance to scattering target objects and to reflecting target objects. The laser beam can be adapted to the type of target object, to the distance to the target object, and to the size of the target object by way of the orientation of the individual transmission elements. In the case of target objects, a distinction is made between scattering target objects, in which an incident laser beam is predominantly scattered, and reflecting target objects, in which an incident laser beam is predominantly reflected.

The reflecting transmission elements of the first array are embodied as reflecting optical elements, the orientation of which is adjustable in at least one direction, with the orientation of the individual transmission elements being adjustable independently of one another. The second laser beam shaping optical unit is arranged downstream of the first laser beam shaping optical unit in the beam path of the laser beam and serves to continue to shape the beam of the laser beam shaped by the first laser beam shaping optical unit. As a rule, the first laser beam shaping optical unit is embodied as a collimation optical unit, which reshapes the divergent laser beam of the laser beam source into a collimated laser beam. The second laser beam shaping optical unit renders it possible to reshape the collimated laser beam and adapt the latter to different scattering target objects and to different reflecting target objects.

Target objects at which a laser beam is scattered are defined as scattering target objects, and target objects at which a laser beam is predominantly reflected are defined as reflecting target objects. In the case of reflecting target objects, a distinction is made between individual retroreflectors and surface retroreflectors. Individual retroreflectors are defined to be reflecting target objects which consist of a prism, wherein the dimensions of the prism are greater than the typical laser beam diameters and an incident laser beam captures a surface of the triple prism. Surface retroreflectors are defined to be reflecting target objects which consist of a plurality of prisms disposed next to one another, wherein the dimensions of the prisms are smaller than the typical laser beam diameters and an incident laser beam captures a plurality of prisms; examples of surface retroreflectors are reflection films and cat's eyes. Within the scope of the present application, scattering target objects are differentiated as white-scattering target objects, gray-scattering target objects, and black-scattering target objects. The scattering target objects are differentiated by means of the so-called value, which describes the scattering properties of scattering target objects. Scattering target objects that have a high degree of backscatter (albedo) of more than 90% are defined as white-scattering target objects.

In a first preferred variant, at least one first transmission arrangement for the first array is stored in the first control unit, wherein the reflecting transmission elements form a convex mirror in the first transmission arrangement for the laser beam. The first transmission arrangement, in which the reflecting transmission elements form a convex mirror for the laser beam, is designed for optically measuring the distance to individual retroreflectors. When optically measuring the distance to an individual retroreflector, the laser beam is expanded by the reflecting transmission elements arranged as a convex mirror. The expansion allows a reduction in the accuracy required in respect of the alignment of the laser beam on the individual retroreflector. In the case of individual retroreflectors, the center of the individual retroreflector should be targeted by the laser beam so that the reflected reception beam is captured by the detector. If the laser beam does not impinge upon the center of the individual retroreflector, the reflected reception beam can miss the detector as a result of the parallel offset.

In a second preferred variant, at least one second transmission arrangement for the first array is stored in the first control unit, wherein the reflecting transmission elements form a concave mirror in the second transmission arrangement for the laser beam. The pre-set second transmission arrangement, in which the reflecting transmission elements form a concave mirror for the laser beam, is designed for optically measuring the distance to scattering target objects. When optically measuring the distance to scattering target objects, the laser beam is focused by the reflecting transmission elements arranged as a concave mirror, with the focal length of the concave mirror depending on the distance of the scattering target object. In the case of the scattering target objects, it is important that the radiant flux captured by the detector is sufficient and the beam diameter of the laser beam should not be too large when impinging on the scattering target object. To restrict the beam diameter of the laser beam on the scattering target object, it is advantageous to focus the laser beam with the aid of the concave mirror.

In a third preferred variant, at least one third transmission arrangement for the first array is stored in the first control unit, wherein the transmission elements form a plane mirror in the third transmission arrangement for the laser beam. The third transmission arrangement, in which the reflecting transmission elements form a plane mirror for the laser beam, is designed for optically measuring the distance to surface retroreflectors and to scattering target objects. When optically measuring the distance to surface retroreflectors, the laser beam is deflected by the reflecting transmission elements arranged as a plane mirror. In the case of surface retroreflectors, it is important that the beam diameter of the laser beam upon incidence on the scattering target object is not too large and not too small either. A beam diameter that is too large can lead to measurement errors in the case of angled surface retroreflectors. By contrast, if the beam diameter is smaller than the prism elements of the surface retroreflectors, there can be a significant variation in the received power, which should be avoided.

Preferably at least one first transmission arrangement for the first array, at least one second transmission arrangement for the first array, and at least one third transmission arrangement for the first array are stored in the first control unit, wherein the reflecting transmission elements form a convex mirror in the first transmission arrangement for the laser beam, the reflecting transmission elements form a concave mirror in the second transmission arrangement for the laser beam, and the reflecting transmission elements form a plane mirror in the third transmission arrangement for the laser beam. An apparatus according to the invention which comprises at least one first transmission arrangement for the first array, at least one second transmission arrangement for the first array, and at least one third transmission arrangement for the first array is suitable for optically measuring the distance to individual retroreflectors, to scattering target objects and to surface retroreflectors.

The use of a plurality of transmission arrangements for the first array allows the second laser beam shaping optical unit to be adapted to different ranges in which a target object is arranged, to different types of target objects (individual retroreflector, surface retroreflector or scattering target object) and to different sizes of target objects. Here, the pre-set first transmission arrangement, in which the reflecting transmission elements form a convex mirror for the laser beam, is designed for measuring the distance to individual retroreflectors, the pre-set second transmission arrangement, in which the transmission elements form a concave mirror for the laser beam, is designed for measuring the distance to scattering target objects and the pre-set third transmission arrangement, in which the transmission elements form a plane mirror for the laser beam, is designed for measuring the distance to surface retroreflectors.

Preferably, the reflecting transmission elements of the first array are adjustable between a first transmission angle range and a second transmission angle range, wherein a transmission partial beam of the laser beam deflected by a transmission element passes an outlet opening, arranged downstream of the second laser beam shaping optical unit in the beam path of the laser beam, in the first transmission angle range and impinges on a first absorption area in the second transmission angle range. The use of a first array of reflecting transmission elements which are adjustable between a first transmission angle range and a second transmission angle range allows a reduction of the radiant flux in the beam path of the laser beam. The transmission partial beams of reflecting transmission elements arranged in the second transmission angle range are masked and the radiant flux of the laser beam is reduced. The reduction in radiant flux is used for measuring the distance to individual retroreflectors and to surface retroreflectors.

The transmission partial beam refers to the part of the laser beam that impinges on a reflecting transmission element and is deflected by the reflecting transmission element. The reflecting transmission element ensures a beam deflection of the transmission partial beam, with the beam shape of the transmission partial beam remaining substantially unchanged. In the case of the third transmission arrangement (plane mirror) there is a beam deflection of the transmission partial beams through 90°, with deflection angles #90° also being possible as a matter of principle (concave and convex mirror). The values for the first transmission angle range and second transmission angle range are determined for each reflecting transmission element of the first array.

The radiant flux of the laser beam emitted by the laser beam source is usually designed for optically measuring the distance to scattering target objects. In the case of scattering target objects, the laser beam is scattered over a large angle range at the target object; only a small part of the radiant flux is captured by the detector. When measuring the distance to reflecting target objects, the laser beam is reflected at the target object and impinges upon the detector as a directed reception beam. To prevent an overload of the detector when measuring the distance to reflecting target objects, the radiant flux of the incident reception beam must be significantly lower than the radiant flux of the emitted laser beam. Here, the radiant flux can be reduced by way of measures in the beam path of the laser beam and/or by way of measures in the beam path of the reception beam.

In a development, the apparatus for optically measuring distances comprises a reception beam shaping device with a first reception beam shaping optical unit and a second reception beam shaping optical unit, which differs from the first reception beam shaping optical unit and is arranged upstream of the first reception beam shaping optical unit in the beam path of the scattered reception beam or reflected reception beam. The first reception beam shaping optical unit is arranged downstream of the second reception beam shaping optical unit in the beam path of the reception beam and serves to shape the beam of the scattered or reflected reception beam. As a rule, the first reception beam shaping optical unit is embodied as a focusing optical unit, which focuses the reception beam on the detector in the case of large distances to the target object (e.g., greater than 20 m). The second reception beam shaping optical unit serves to adapt the reception beam reflected by reflecting target objects.

Preferably, the second reception beam shaping optical unit is embodied as a second array of reflecting reception elements, wherein the orientation of the reflecting reception elements is adjustable by means of a second control unit. The reflecting reception elements are embodied as reflecting optical elements, the orientation of which is adjustable in at least one direction, with the orientation of the individual reflecting reception elements being adjustable independently of one another. A second reception beam shaping optical unit embodied as a second array of a plurality of reflecting reception elements is suitable for optically measuring the distance to scattering target objects and to reflecting target objects. The reception beam can be adapted to the type of target object, to the distance to the reflecting target object, and to the size of the reflecting target object by way of the beam deflection properties of the individual reflecting reception elements.

In a first preferred variant, at least one first reception arrangement for the second array is stored in the second control unit, wherein the reflecting reception elements form a convex mirror for the reception beam. The first reception arrangement, in which the reflecting reception elements form a convex mirror for the reception beam, is predominantly designed for measuring the distance to individual retroreflectors.

In a second preferred variant, at least one second reception arrangement for the second array is stored in the second control unit, wherein the reflecting reception elements form a concave mirror for the reception beam. The second reception arrangement, in which the reflecting reception elements form a concave mirror for the reception beam, is predominantly designed for measuring the distance to scattering target objects.

In a third preferred variant, at least one third reception arrangement for the second array is stored in the second control unit, wherein the reflecting reception elements form a plane mirror for the reception beam. The third reception arrangement, in which the reflecting reception elements form a plane mirror for the reception beam, is predominantly designed for measuring the distance to surface retroreflectors.

Preferably, at least one first reception arrangement for the second array, at least one second reception arrangement for the second array, and at least one third reception arrangement for the second array are stored in the second control unit, wherein the reflecting reception elements form a convex mirror in the first reception arrangement for the reception beam, the reflecting reception elements form a concave mirror in the second reception arrangement for the reception beam, and the reflecting reception elements form a plane mirror in the third reception arrangement for the reception beam. An apparatus according to the invention which comprises at least one first reception arrangement for the second array, at least one second reception arrangement for the second array, and at least one third reception arrangement for the second array is suitable for optically measuring the distance to individual retroreflectors, to scattering target objects and to surface retroreflectors.

Preferably, the reflecting reception elements are adjustable independently of one another between a first reception angle range and a second reception angle range, wherein a reception partial beam of the reception beam deflected by a reflecting reception element impinges on the detector in the first reception angle range and impinges on a second absorption area in the second reception angle range. The use of a second array of reflecting reception elements which are adjustable between a first reception angle range and a second reception angle range allows a reduction of the radiant flux in the beam path of the reception beam. The reception partial beams of reflecting reception elements arranged in the second reception angle range are masked and the radiant flux of the reception beam is reduced. The reduction in the received power is used for measuring the distance to individual retroreflectors and to surface retroreflectors.

The reception partial beam refers to part of the reception beam that impinges on a reflecting reception element and is deflected by the reflecting reception element. The reflecting reception element ensures a beam deflection of the incident reception partial beam, with the beam shape of the partial reception beam remaining substantially unchanged. In the case of the third reception arrangement (plane mirror) there is a beam deflection of the reception partial beams through 90°, with deflection angles #90° also being possible as a matter of principle (concave and convex mirror).

Exemplary embodiments of the invention are described hereinafter with reference to the drawings. It is not necessarily intended for this to illustrate the exemplary embodiments to scale; instead, where useful for explanation, the drawings are produced in a schematic and/or slightly distorted form. It should be taken into account here that various modifications and alterations relating to the form and detail of an embodiment may be undertaken without departing from the general concept of the invention. The general concept of the invention is not limited to the exact form or the detail of the preferred embodiment shown and described hereinafter or limited to subject matter that would be limited compared to the subject matter claimed in the claims. For given dimensioning ranges, values within the stated limits should also be disclosed as limit values and can be used and claimed as desired. For the sake of simplicity, identical reference signs are used hereinafter for identical or similar parts or parts having identical or similar function.

DETAILED DESCRIPTION OF THE DRAWINGS

Figure 1:
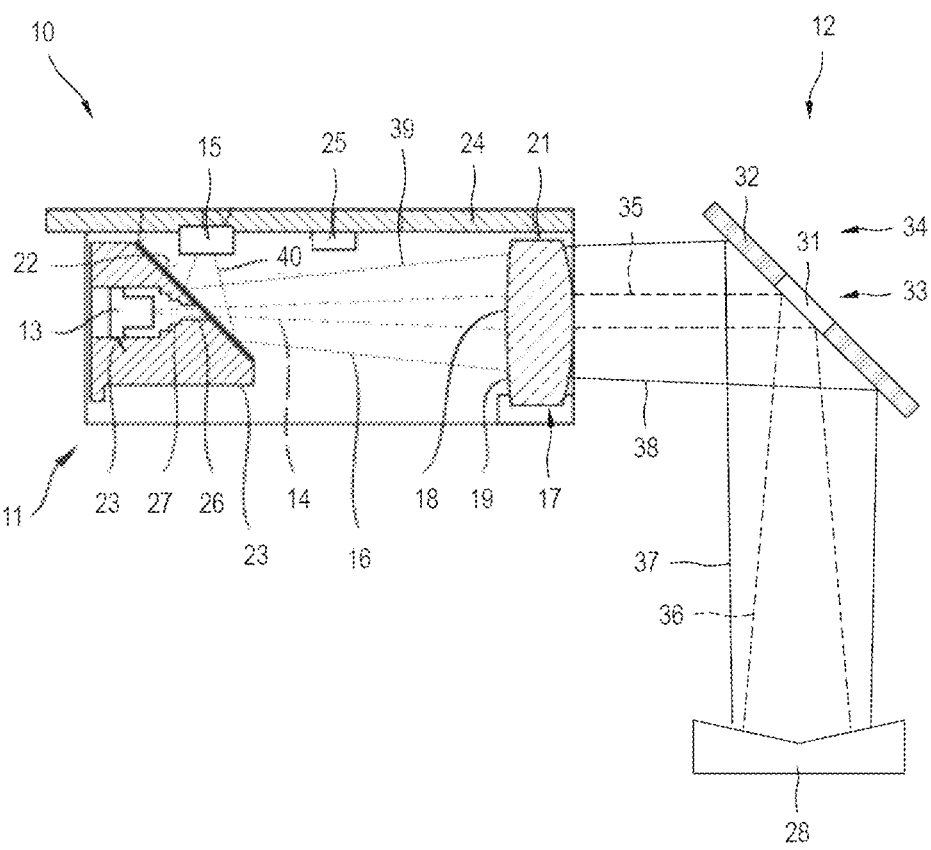
FIG. 1 shows an apparatus according to the invention for optically measuring distances, consisting of a distance measuring device and an adjustment device.

FIG. 1 shows an apparatus 10 according to the invention for optically measuring the distance to a target object, consisting of a distance measuring device 11 and an adjustment device 12, the latter being arranged outside of the distance measuring device 11. The apparatus 10 is embodied to measure the distance to scattering target objects and to reflecting target objects.

The distance measuring device 11 comprises a first electro-optical component, which is embodied as a beam source 13 and generates a laser beam 14, a second electro-optical component, which is embodied as a detector 15 and receives a reception beam 16 that has been scattered or reflected in a target object, and a beam shaping system 17, which comprises a first laser beam shaping optical unit 18 for beam shaping of the laser beam 14 and a first reception beam shaping optical unit 19 for shaping the beam of the reception beam 16. In the exemplary embodiment, the first laser beam shaping optical unit 18 and the first reception beam shaping optical unit 19 are integrated in a common beam shaping optical unit 21.

In the exemplary embodiment, the distance measuring device 11 has a coaxial embodiment, i.e., the laser beam 14 and the reception beam 16 extend coaxially to one another. To separate the laser beam 14 and the reception beam 16 from one another, provision is made of a beam splitter optical unit 22, which is arranged between the beam source 13 and the beam shaping optical unit 21 in the beam path of the laser beam 14 and between the beam shaping optical unit 21 and the detector 15 in the beam path of the reception beam 16. By way of example, the beam splitter optical unit 22 can be embodied as a polarization beam splitter, as a perforated mirror or as any other beam splitting optical element.

The distance measuring device 11 additionally comprises an optical unit support 23 and a circuit board 24. The beam source 13, the beam shaping optical unit 21, and the beam splitter optical unit 22 are fastened to the optical unit support 23 and the detector 15 is fastened to the circuit board 24. The structure of the distance measuring device 11 corresponds to the structure described in EP 2 527 867 B 1. A control and evaluation device 25 is connected to the beam source 13 and the detector 15 and, for example, determines the distance to the target object from a time difference between a reference beam and the reception beam.

An aperture stop 26 can be arranged in the beam path of the laser beam 14 between the beam source 13 and the beam splitter optical unit 22 and can be integrated into the monolithic optical unit support 18. The aperture stop 26 serves to limit the aperture angle of the beam source 13 and to adapt the geometry of the laser beam 14 to the beam splitter optical unit 22 and the first laser beam shaping optical unit 18. A light trap 27 can be provided between the beam source 13 and the aperture stop 26; like the aperture stop 26, the light trap can be integrated in the monolithic optical unit support 23. The light trap 27 serves to absorb incident light and prevent unwanted reflections. To this end, the light trap 27 is provided with a low reflection, absorbing coating on its inner side. The aperture stop 26 and the light trap 27 can reduce optical and electrical crosstalk from the beam source 13 to the detector 15 and interfering artifacts in the laser beam.

A reflecting target object embodied as an individual retroreflector 28, which is located at a short distance from the distance measuring device 11, is used as a target object in the exemplary embodiment of FIG. 1. The adjustment device 12 comprises a second laser beam shaping optical unit 31 and a second reception beam shaping optical unit 32. The second laser beam shaping optical unit 31 comprises a first array with reflecting transmission elements and the second reception beam shaping optical unit 32 comprises a second array with reflecting reception elements. The first laser beam shaping optical unit 18 and the second laser beam shaping optical unit 31 are referred to together as laser beam shaping device 33 and the first reception beam shaping optical unit 19 and the second reception beam shaping optical unit 32 are referred to together as reception beam shaping device 34.

The beam source 13 emits the laser beam 14, which is directed at the beam splitter optical unit 22. A greatest possible portion of the laser beam 14 is transmitted to the beam splitter optical unit 22 and the transmitted portion of the laser beam impinges upon the first laser beam shaping optical unit 18, where first beam shaping of the laser beam is implemented. In the exemplary embodiment, the first laser beam shaping optical unit 18 is embodied as a collimation lens, which collimates the laser beam 14 and directs the latter at the second laser beam shaping optical unit 31 as a collimated laser beam 35. The optical properties of the collimation lens 18 are adapted for measuring the distance of scattering target objects at a large distance (infinity). The collimated laser beam 35 impinges on the second laser beam shaping optical unit 31, where there is a deflection of the laser beam and possibly further beam shaping of the laser beam. The deflected and possibly shaped laser beam 36 impinges on the target object 28.

A reception beam 37 reflected at the target object 28 impinges on the second reception beam shaping optical unit 32, where there is a deflection of the reception beam and possibly beam shaping of the reception beam. The deflected and possibly reshaped reception beam 38 is directed at the first reception beam shaping optical unit 19. There is a further beam shaping of the deflected and possibly reshaped reception beam 38 at the first reception beam shaping optical unit 19. The reshaped reception beam 39 is directed at the beam splitter optical unit 22 and deflected at the beam splitter optical unit 22. The deflected reception beam 40 impinges on the detector 15.

Figure 2:
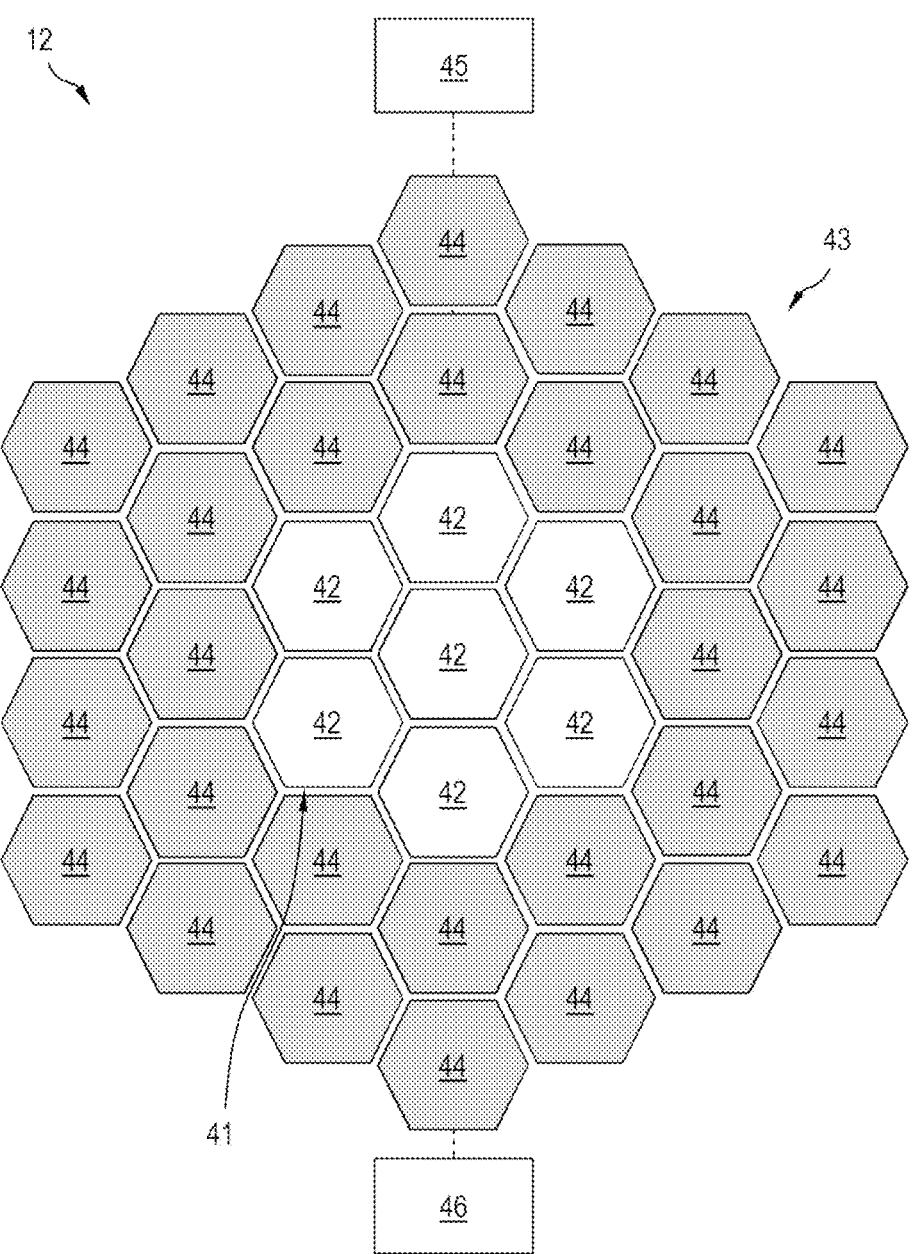
FIG. 2 shows the adjustment device of FIG. 1 with a first array of reflecting transmission elements and a second array of reflecting reception elements.

FIG. 2 shows the adjustment device 12 of FIG. 1 with the second laser beam shaping optical unit 31, which is embodied as a first array 41 of reflecting transmission elements 42, and the second reception beam shaping optical unit 32, which is embodied as a second array 43 of reflecting reception elements 44.

The distance measuring device 11 generates the collimated laser beam with the aid of the first laser beam shaping optical unit 18. The second laser beam shaping optical unit 31, which adapts the laser beam to the target object, is arranged in the beam path of the collimated laser beam. The distance measuring device 11 has a coaxial structure, meaning that the laser beam and reception beam are arranged coaxially to one another in the common beam path. The beam splitter optical unit 22 separates the laser beam 14 and the reception beam 16 from one another; in the exemplary embodiment of FIG. 1, the laser beam 14 passes the beam splitter optical unit 22 and the reception beam 16 is deflected at the beam splitter optical unit 22.

The laser beam can be adapted to the type of target object, to the distance to the target object, and to the size of the target object by way of the orientation of the reflecting transmission elements 42. The reflecting transmission elements 42 are adjustable in terms of their orientation by means of a first control unit 45; each reflecting transmission element 42 is connected to a drive element which changes the orientation of the reflecting transmission element 42 with respect to the laser beam. The reflecting reception elements 44 are adjustable in terms of their orientation by means of a second control unit 46; each reflecting reception element 44 is connected to a drive element which changes the orientation of the reflecting reception element 44 with respect to the reception beam.

The reflecting transmission elements 42 of the first array 41 and the reflecting reception elements 44 of the second array 43 have a plane mirror surface. The reflecting transmission elements 42 form a facet mirror, with the individual transmission elements 42 reflecting partial beams of the laser beam; the reflected partial beams can be overlaid downstream of the second laser beam shaping optical unit 31. The reflecting reception elements 44 form a facet mirror, with the individual reception elements 44 reflecting partial beams of the reception beam; the reflected partial beams can be overlaid downstream of the second reception beam shaping optical unit 32.

Figure 3A:
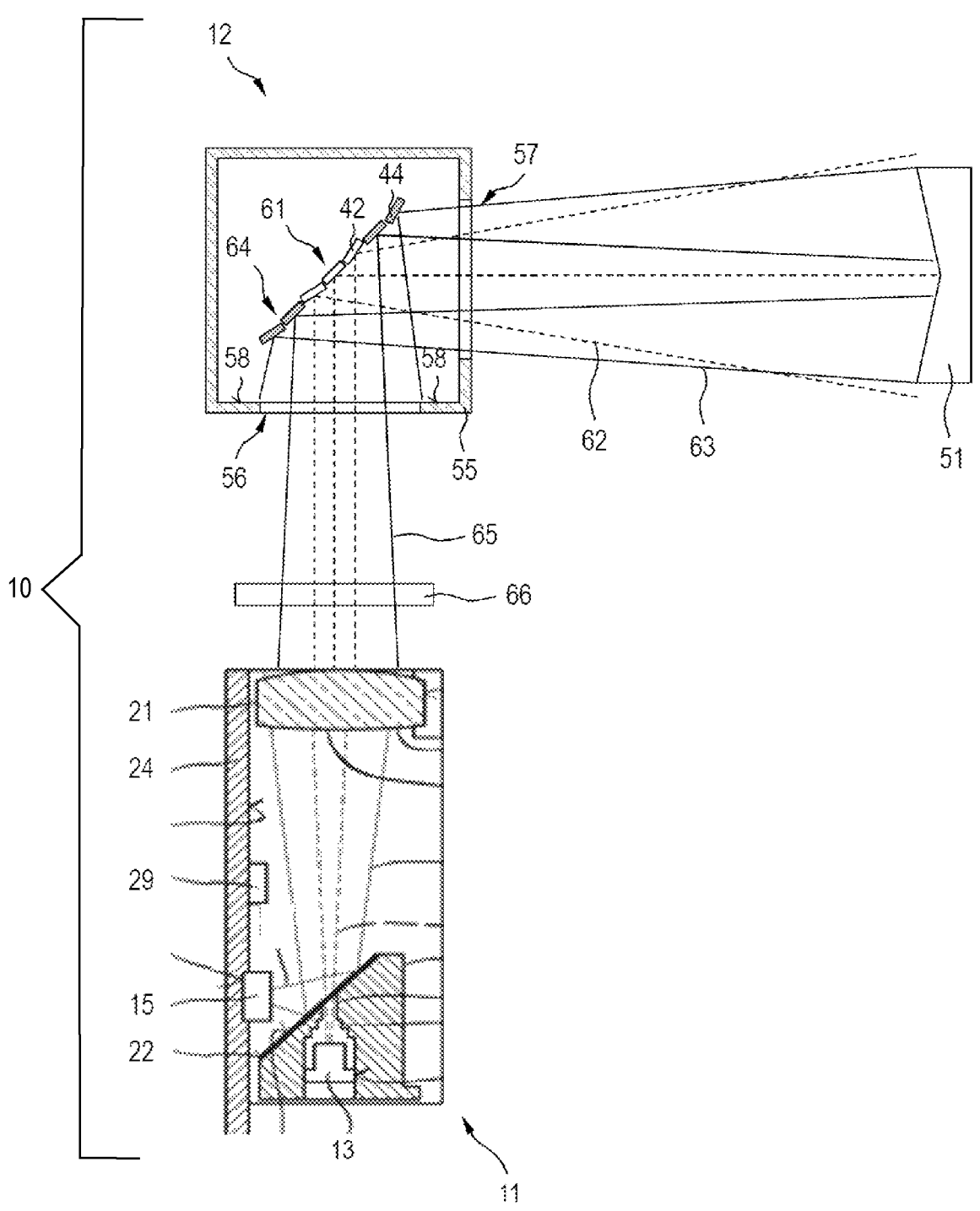
FIGS. 3A-C show the optical distance measurement with the aid of the apparatus according to the invention of FIG. 1, to a target object embodied as an individual retroreflector (FIG. 3A), as a scattering target object (FIG. 3B), and as a surface retroreflector (FIG. 3C).
Figure 3B:
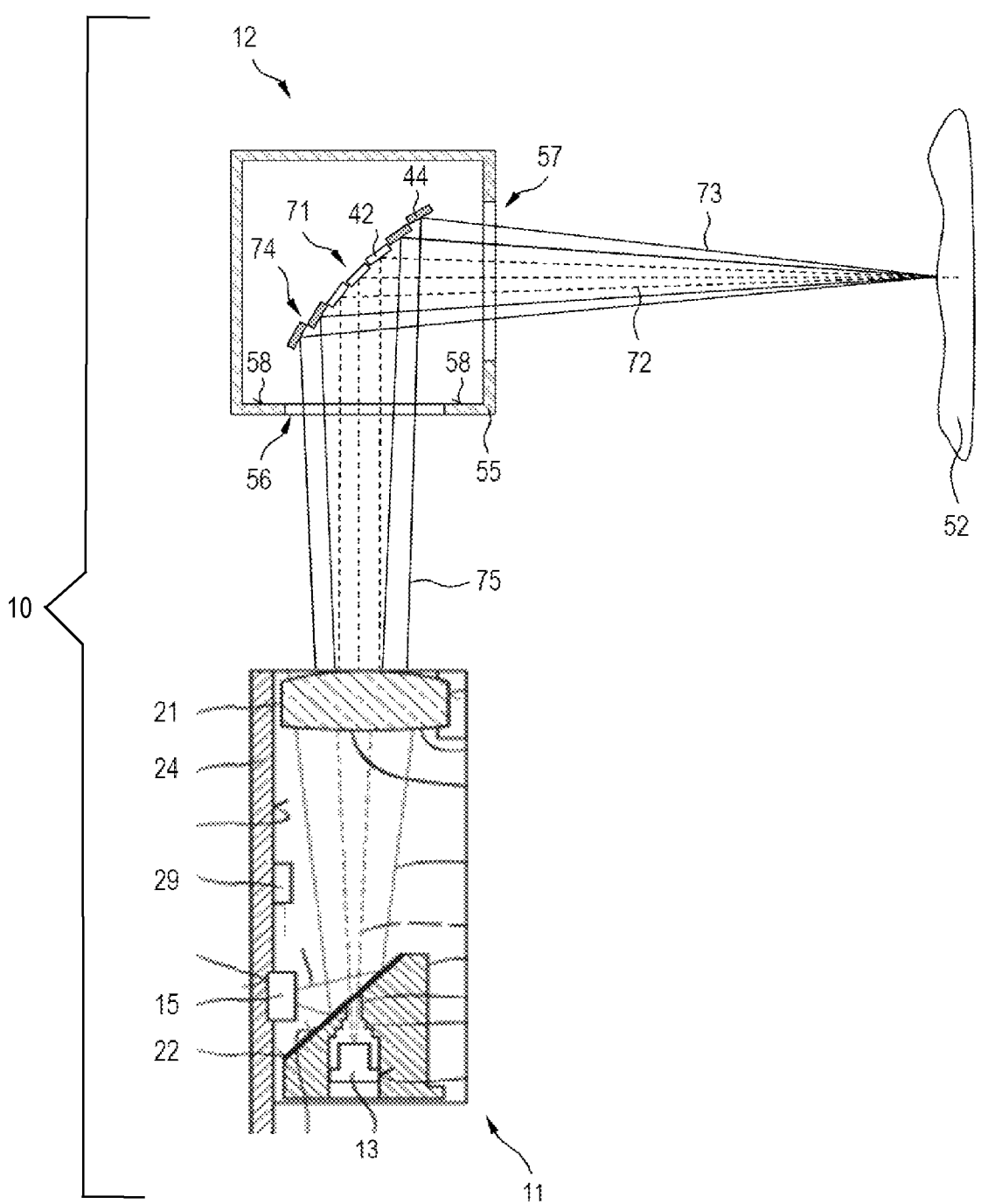
Figure 3C:
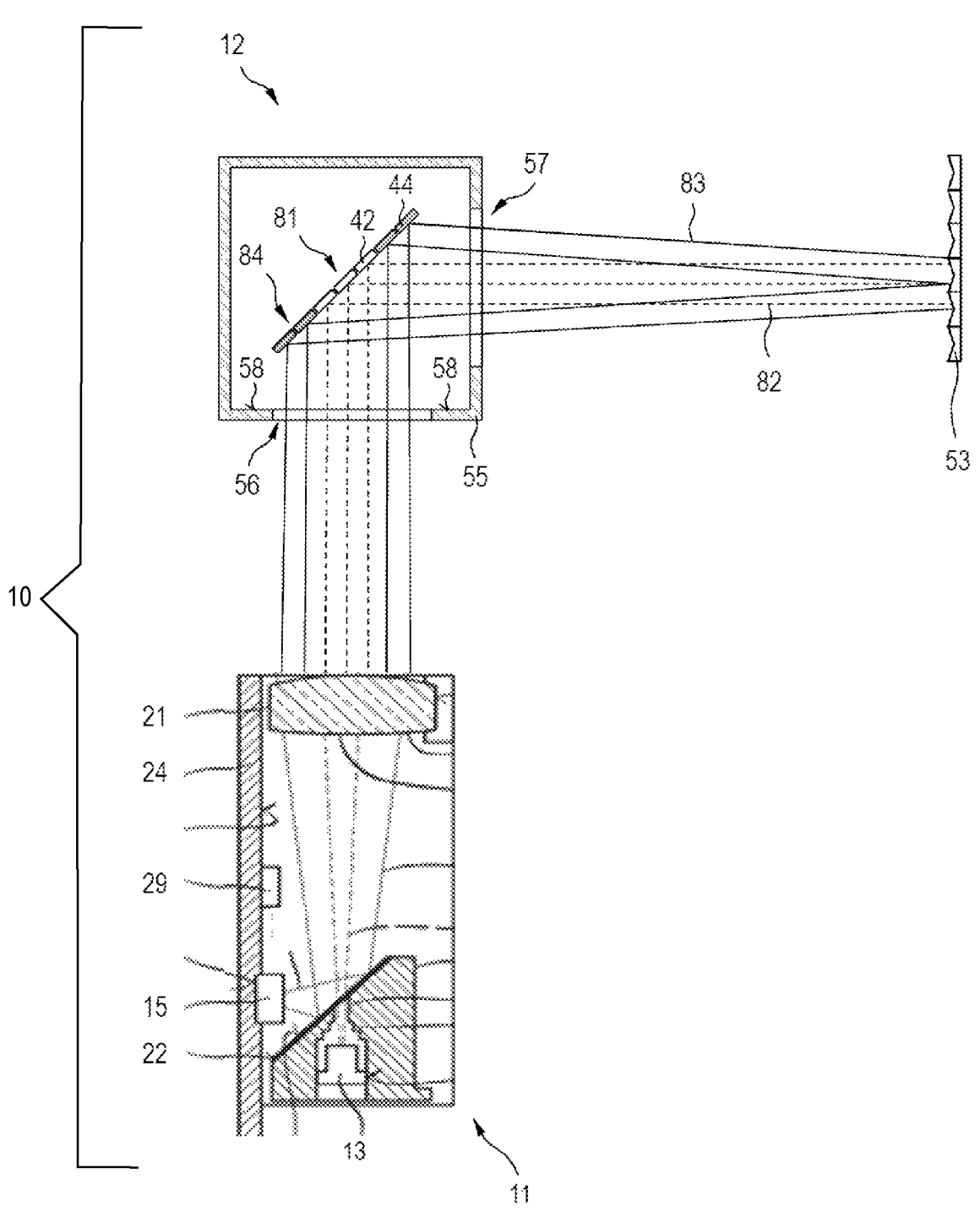

FIGS. 3A-C show the optical distance measurement with the aid of the apparatus 10 according to the invention, to a target object embodied as an individual retroreflector 51 (FIG. 3A), as a scattering target object 52 (FIG. 3B), and as a surface retroreflector 53 (FIG. 3C).

The first and second array 41, 42 are arranged in a housing 55 which has a first opening 56 and a second opening 57. The collimated laser beam 35 enters the housing 55 via the first opening 56 and is reshaped by the reflecting transmission elements 42 of the first array 41. The partial beams reflected at the transmission elements 42 leave the housing 55 via the second opening 57 and are overlaid outside of the housing. To reduce the radiant flux of the laser beam and/or of the reception beam, it is possible to align one or more reflecting transmission elements 42 or one or more reflecting reception elements 44 in such a way that their partial beams impinge on an absorption area 58 within the housing 55 and do not leave the housing 55 via the first or second opening 56, 57.

FIG. 3A shows the optical distance measurement to the individual retroreflector 51. In the case of the individual retroreflector 51, it is important that the center of the individual retroreflector is struck by the laser beam so that the reflected reception beam certainly impinges on the reception beam shaping optical unit 19 and is captured by the detector 15. If the laser beam does not impinge upon the center of the individual retroreflector 51, the reflected reception beam can miss the first reception beam shaping optical unit 19 as a result of the parallel offset. Expanding the laser beam is advantageous in reducing the accuracy with which the laser beam must be aligned at the individual retroreflector 51.

The reflecting transmission elements 42 of the first array 41 form a convex mirror 61 for the laser beam, which leads to an expansion of the laser beam. The arrangement of the reflecting transmission elements 42 shown in FIG. 3A can be stored in the first control unit 45 as a first transmission arrangement for the first array 41. Advantageously, a plurality of first transmission arrangements for the first array 41 are stored in the first control unit 45 for individual retroreflectors 51, which are arranged at different distances from the distance measuring device 11 or which have different sizes. What applies here is that the focal length of the convex mirror 61 formed by the reflecting transmission elements 42 increases with increasing distance.

The laser beam is reshaped into an expanded laser beam 62 by the convex mirror 61. In the exemplary embodiment, all reflecting transmission elements 42 form the convex mirror 61, with each reflecting transmission element 42 reflecting a partial beam of the collimated laser beam 35 and the reflected partial beams leaving the housing 55 via the second opening 57 and superimposing one another to form the expanded laser beam 62. The expanded laser beam 62 impinges on the individual retroreflector 51 and is reflected there. The reflected reception beam 63 enters the housing 55 via the second opening 57 and is deflected and shaped by the reflecting reception elements 44 of the second array 43. The reflecting reception elements 44 form a convex mirror 64 for the reflected reception beam 63, the convex mirror leading to an expansion of the reception beam. The expanded reception beam 65 leaves the housing 55 through the first opening 56.

The arrangement of the reflecting reception elements 44 shown in FIG. 3A can be stored in the second control unit 46 as a first reception arrangement for the second array 43. A plurality of first reception arrangements for the second array 43 are advantageously stored in the second control unit 46 for individual retroreflectors 51, which are arranged at different distances from the distance measuring device 11 or which have different sizes. What applies here is that the focal length of the convex mirror 64 formed by the reflecting reception elements 44 increases with increasing distance.

The radiant flux of the laser beam source 13 is designed for optically measuring the distance to scattering target objects, in which only a small proportion reaches the detector 15. In the case of reflecting target objects, in particular in the case of individual retroreflectors, the radiant flux impinging on the detector 15 is too high, which may lead to an overload of the detector 15. The radiant flux must be reduced to prevent the detector 15 from overloading, wherein the reduction can be brought about in the laser beam, in the reception beam or in the laser and reception beam. To reduce the radiant flux of the reflected reception beam 63, some reflecting reception elements 44 can be aligned in such a way that their partial beams impinge on the absorption area 58 and do not leave the housing 55 via the first opening 56. As an alternative or in addition thereto, the radiant flux of the laser beam and/or of the reception beam can be reduced by means of an attenuation device 66.

The attenuation device 66 is arranged between the first laser beam shaping optical unit 18 and the second laser beam shaping optical unit 31 in the beam path of the laser beam. This arrangement of the attenuation device between the first and second laser beam shaping optical unit is advantageous in that the attenuation is implemented in the collimated laser beam. The attenuation element can be slanted in the collimated laser beam in order to prevent, or at least reduce, a back-reflection of the laser beam in the direction of the laser beam source or of the detector.

The attenuation device is adjustable between a first state, in which attenuation is implemented, and a second state, in which no attenuation is implemented. An attenuation device which is adjustable between two states is suitable for optically measuring the distance to scattering target objects and to reflecting target objects, which are embodied as individual retroreflectors or as surface retroreflectors. The first state of the attenuation device is provided for optically measuring the distance to reflecting target objects and the second state of the attenuation device is provided for optically measuring the distance to scattering target objects.

FIG. 3B shows the optical distance measurement to the scattering target object 52. In the case of the scattering target objects, it is important that the radiant flux captured by the detector 15 is sufficiently large; moreover, the beam diameter of the laser beam should not be too large when impinging on the scattering target object. To restrict the beam diameter of the laser beam on the scattering target object 52, it is advantageous to focus the laser beam.

The reflecting transmission elements 42 of the first array 41 form a concave mirror 71 for the laser beam, which leads to focusing of the laser beam. The arrangement of the reflecting transmission elements 42 shown in FIG. 3B can be stored in the first control unit 45 as a second transmission arrangement for the first array 41. A plurality of second transmission arrangements for the first array 41 are advantageously stored in the first control unit 45 for scattering target objects 52, which are arranged at different distances from the distance measuring device 11 and/or which have different degrees of back-scattering (albedo). What applies here is that the focal length of the concave mirror 71 formed by the reflecting transmission elements 42 increases with increasing distance.

The collimated laser beam 35 enters the housing 55 via the first opening 56 and is deflected and shaped by the reflecting transmission elements 42 of the first array 41. In the exemplary embodiment, all the reflecting transmission elements 42 form the concave mirror 71, wherein each reflecting transmission element 42 reflects a partial beam of the collimated laser beam 35. The reflected partial beams leave the housing 55 via the second opening 57 and are overlaid to form the focused laser beam 72. The focused laser beam 72 impinges on the scattering target object 52 and is scattered there. The scattered reception beam 73 enters the housing 55 via the second opening 57 and is deflected and possibly shaped by the reception elements 44 of the second array 43. The reflecting reception elements 44 form a concave mirror 74, which leads to focusing of the reception beam. The focused reception beam 75 leaves the housing 55 through the first opening 56.

The arrangement of the reflecting reception elements 44 shown in FIG. 3B can be stored in the second control unit 46 as a second reception arrangement for the second array 43. A plurality of second reception arrangements for the second array 43 are advantageously stored in the second control unit 46 for scattering target objects 52, which are arranged at different distances from the distance measuring device 11 and/or which have different degrees of back-scattering (albedo). What applies here is that the focal length of the concave mirror 74 formed by the reflecting reception elements 44 increases with increasing distance.

FIG. 3C shows the optical distance measurement to the surface retroreflector 53. In surface retroreflectors, the ratio of the beam diameter of the laser beam to typical dimensions of the surface retroreflector is important. Here, the beam diameter of the laser beam should be of the order of the typical dimension when impinging on the surface retrore-flector. To ensure this, the laser beam can be slightly focused in the case of long distances and can be slightly expanded in the case of short distances.

The reflecting transmission elements 42 of the first array 41 form a plane mirror 81 for the laser beam, which leads to a deflection of the laser beam. The arrangement of the reflecting transmission elements 42 shown in FIG. 3C can be stored in the first control unit 45 as a third transmission arrangement for the first array 41. A plurality of third transmission arrangements for the first array 41 are advan-tageously stored in the first control unit 45 for surface retroreflectors 53, which are arranged at different distances from the distance measuring device 11 or which have different sizes.

The collimated laser beam 35 enters the housing 55 via the first opening 56 and is deflected by the reflecting transmission elements 42 of the first array 41. In the exem-plary embodiment, all the reflecting transmission elements 42 form the plane mirror 81, wherein each reflecting trans-mission element 42 reflects a partial beam of the collimated laser beam 35. The reflected partial beams leave the housing 55 via the second opening 57 and are overlaid to form the collimated laser beam 82. The collimated laser beam 82 impinges on the reflecting target object 53 and is reflected. The reflected reception beam 83 enters the housing 55 via the second opening 57 and is deflected by the reflecting reception elements 44 of the second array 43. The reflecting reception elements 44 form a plane mirror 84 for the surface retroreflector 53, the plane mirror leading to a deflection. To reduce the radiant flux of the reception beam 83, some reflecting reception elements 44 are aligned in such a way that their partial beams impinge on the absorption area 58 and do not leave the housing 55 via the second opening 57.

The arrangement of the reflecting reception elements 44 shown in FIG. 3C can be stored in the second control unit 46 as a third reception arrangement for the second array 43. A plurality of third reception arrangements for the second array 43 are advantageously stored in the second control unit 46 for surface retroreflectors 53, which are arranged at different distances from the distance measuring device 11 or which have different sizes.

The invention claimed is:

1. An apparatus (10) for optically measuring a distance to a scattering target object (52) and a reflecting target object (51; 53), comprising:

a laser beam source (13) which is embodied as a first electro-optical component and which emits a laser beam (14);

a detector (15) which is embodied as a second electro-optical component and which receives a reception beam (73) that has been scattered at the scattering target object (52) or a reception beam (63; 83) that has been reflected at the reflecting target object (51; 53); and a laser beam shaping device (33) with a first laser beam shaping optical unit (18) and a second laser beam shaping optical unit (31), wherein the second laser beam shaping optical unit (31) differs from the first laser beam shaping optical unit (18) and is disposed downstream of the first laser beam shaping optical unit (18) in a beam path of the laser beam (14, 34);

wherein the second laser beam shaping optical unit (31) is embodied as a first array (41) of reflecting transmission elements (42) and wherein an orientation of the reflect-ing transmission elements (42) is adjustable by a first control unit (45) to adjust the orientation such that the laser beam (14) is adaptable to different types of a target object, to a distance to the target object, and to a size of the target object, wherein the different types of the target object include the scattering target object (52) and the reflecting target object (51; 53).

2. The apparatus as claimed in claim 1, wherein a first transmission arrangement for the first array (41) is stored in the first control unit (45) and wherein the reflecting trans-mission elements (42) form a convex mirror (61) in the first transmission arrangement for the laser beam.

3. The apparatus as claimed in claim 1, wherein a second transmission arrangement for the first array (41) is stored in the first control unit (45) and wherein the reflecting trans-mission elements (42) form a concave mirror (71) in the second transmission arrangement for the laser beam.

4. The apparatus as claimed in claim 1, wherein a third transmission arrangement for the first array (41) is stored in the first control unit (45) and wherein the reflecting trans-mission elements (42) form a plane mirror (81) in the third transmission arrangement for the laser beam.

5. The apparatus as claimed in claim 1, wherein a first transmission arrangement for the first array (41), a second transmission arrangement for the first array (41), and a third transmission arrangement for the first array (41) are stored in the first control unit (45) and wherein the reflecting transmission elements (42) form a convex mirror (61) in the first transmission arrangement for the laser beam, the reflect-ing transmission elements (42) form a concave mirror (71) in the second transmission arrangement for the laser beam, and the reflecting transmission elements (42) form a plane mirror (81) in the third transmission arrangement for the laser beam.

6. The apparatus as claimed in claim 1, wherein the reflecting transmission elements (42) of the first array (41) are adjustable between a first transmission angle range and a second transmission angle range and wherein a transmis-sion partial beam of the laser beam deflected by a reflecting transmission element (42) of the reflecting transmission elements (42) passes a second opening (57), disposed down-stream of the second laser beam shaping optical unit (31) in the beam path of the laser beam, in the first transmission angle range and impinges on an absorption area (58) in the second transmission angle range.

7. The apparatus as claimed in claim 1, further comprising a reception beam shaping device (34) with a first reception beam shaping optical unit (19) and a second reception beam shaping optical unit (32), wherein the second reception beam shaping optical unit (32) differs from the first reception beam shaping optical unit (19) and is disposed upstream of the first reception beam shaping optical unit (19) in a beam path of the reception beam.

8. The apparatus as claimed in claim 7, wherein the second reception laser beam shaping optical unit (32) is embodied as a second array (43) of reflecting reception elements (44) and wherein an orientation of the reflecting reception elements (44) is adjustable by a second control unit (46).

9. The apparatus as claimed in claim 8, wherein a first reception arrangement for the second array (43) is stored in the second control unit (46) and wherein the reflecting reception elements (44) form a convex mirror (64) in the first reception arrangement for the reception beam.

10. The apparatus as claimed in claim 8, wherein a second reception arrangement for the second array (43) is stored in the second control unit (46) and wherein the reflecting reception elements (44) form a concave mirror (74) in the second reception arrangement for the reception beam.

11. The apparatus as claimed in claim 8, wherein a third reception arrangement for the second array (43) is stored in the second control unit (46) and wherein the reflecting reception elements (44) form a plane mirror (84) in the third reception arrangement for the reception beam.

12. The apparatus as claimed in claim 8, wherein a first reception arrangement for the second array (43), a second reception arrangement for the second array (43), and a third reception arrangement for the second array (43) are stored in the second control unit (46) and wherein the reflecting reception elements (44) form a convex mirror (64) in the first reception arrangement for the reception beam, the reflecting reception elements (44) form a concave mirror (74) in the second reception arrangement for the reception beam, and the reflecting reception elements (44) form a plane mirror (84) in the third reception arrangement for the reception beam.

13. The apparatus as claimed in claim 8, wherein the reflecting reception elements (44) are adjustable independently of one another between a first reception angle range and a second reception angle range and wherein a reception partial beam of the reception beam deflected by a reflecting reception element (44) of the reflecting reception elements (44) impinges on the detector (15) in the first reception angle range and impinges on an absorption area (58) in the second reception angle range.

\* \* \* \* \*